(12) United States Patent
Chien

(10) Patent No.: US 7,667,956 B2
(45) Date of Patent: Feb. 23, 2010

(54) PORTABLE ELECTRONIC APPARATUS AND HOUSING THEREOF

(75) Inventor: Chih Ling Chien, Taoyuan (TW)

(73) Assignee: High Tech Computer Corporation (TW)

( * ) Notice: Subject to any disclaimer, the term of this patent is extended or adjusted under 35 U.S.C. 154(b) by 0 days.

(21) Appl. No.: 12/099,860

(22) Filed: Apr. 9, 2008

(65) Prior Publication Data

US 2009/0258673 A1    Oct. 15, 2009

(51) Int. Cl.
*H05K 5/00* (2006.01)
*H05K 7/00* (2006.01)

(52) U.S. Cl. .............................. 361/679.21; 361/679.02

(58) Field of Classification Search ................ 361/681, 361/679.21, 679.22, 679.26, 679.02; 455/575.1, 455/575.3, 575.4, 575.88

See application file for complete search history.

(56) References Cited

U.S. PATENT DOCUMENTS 6,144,552 A * 11/2000 Whitcher et al. ............ 361/681

2006/0105821 A1 * 5/2006 Goradesky et al. ....... 455/575.1
2007/0041149 A1 * 2/2007 Homer et al. ............... 361/681

* cited by examiner

*Primary Examiner*—Jayprakash N Gandhi
*Assistant Examiner*—Anthony M Haughton
(74) *Attorney, Agent, or Firm*—Connolly Bove Lodge & Hutz LLP

(57) ABSTRACT

A portable electronic apparatus comprises one or more protrusion structures on a surface of the portable electronic apparatus. The protrusion structure comprises a plurality of facets, and one or more peaks are formed on the junctions of the facets. The facets are preferably in the form of triangles or quadrangles, and the protrusion structure is in the form of a pyramid of a triangular base or a quadrangular base. In an embodiment, the protrusion structure is formed on the back housing of the portable electronic apparatus, so that an electronic device, e.g., a digital camera module, embedded in the back housing can be protected to minimize the likelihood of damage.

14 Claims, 7 Drawing Sheets

PORTABLE ELECTRONIC APPARATUS AND HOUSING THEREOF

BACKGROUND OF THE INVENTION (A) Field of the Invention

The present invention is related to a portable electronic apparatus and housing thereof, and more specifically, to a portable electronic apparatus and housing thereof with high rigidity.

(B) Description of the Related Art

Recently, portable electronic apparatuses, such as portable computers, cellular phones, smart phones and personal digital assistants (PDA), have been developed with multiple functions and a compact size. Further, display panels and keypads have been made with a very thin structure in order to enhance the compact size of portable electronic apparatuses, and a camera module installed in a portable electronic apparatus has become popular.

Generally, such a portable electronic apparatus includes a flat housing body. However, if the user drops the portable electronic apparatus, the flat housing body may be broken and the embedded electronic device such as a camera module and the camera lens thereof would be damaged.

An electronic apparatus of superior rigidity can minimize the hazardous impact that could damage the internal components. Therefore, there is a need to increase the mechanical properties such as rigidity and strength of a portable electronic apparatus, especially the housing body thereof, so as to prevent the embedded electronic devices from being damaged.

SUMMARY OF THE INVENTION

The present invention provides a portable electronic apparatus and the housing thereof with a rear side, which has at least three facets to form at least one peak. The rear side with the facets can withstand an impact to the portable electronic apparatus so as to prevent electronic devices embedded in the portable electronic apparatus from being damaged.

In accordance with the present invention, the portable electronic apparatus includes a display and a housing. The display is configured to display data. The housing accommodates the display and has a rear side opposite to the display. The rear side includes at least three facets that form at least one peak. The facets are preferably in the form of triangles, and may form a pyramid protruding from the rear side.

According to force equilibrium of static mechanics, a force applied to the peak of the rear side will be withstood by plural forces each with a small amount. Therefore, the rear side with the peak is not easily damaged.

A housing of the portable electronic apparatus comprising the above-mentioned rear side is also covered by the scope of the present invention. In an embodiment, one or more peaks are formed on the rear side of the portable electronic apparatus, so that an electronic device, e.g., a digital camera module, embedded in the rear side can be well protected to minimize the likelihood of damage.

In accordance with the present invention, the mechanical properties such as rigidity and strength of the portable electronic apparatus can be significantly improved, and the housing with the facets described herein can share the forces and withstand the impact in a dropping test or a so-called choc test for testing endurance, such as a scratch test, in various situations.

DETAILED DESCRIPTION OF THE INVENTION

Figure 1A:
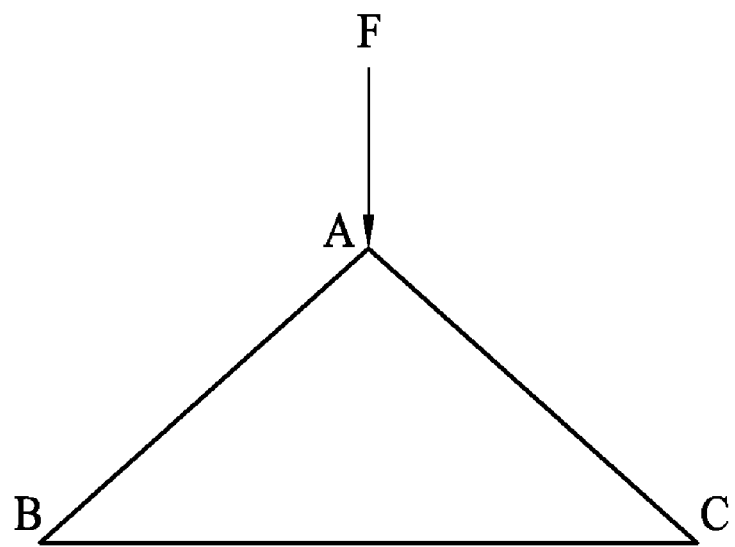
FIG. 1(a) illustrates a force acting on a protrusion structure.
Figure 1B:
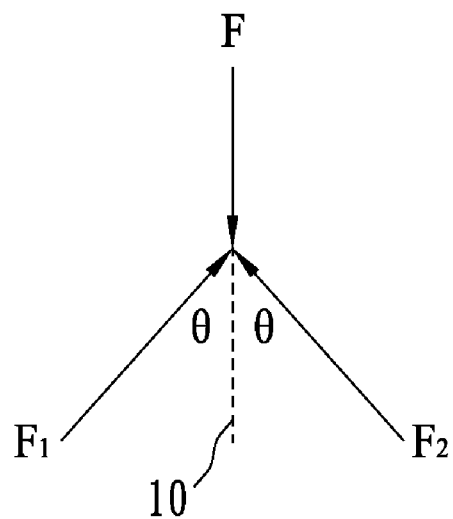
FIG. 1(b) illustrates a force equilibrium model for the force acting on the protrusion structure as shown in FIG. 1.

As shown in FIG. 1(a), a force F acts on a point of a rigid body, e.g., a peak A of a protrusion structure with two bottom corners B and C, and two forces $F_1$ and $F_2$ will be respectively generated along the inclined sides B to A and C to A of the protrusion structure as shown in FIG. 1(b). According to force equilibrium in static mechanics, $F=F_1 \cos \theta + F_2 \cos \theta$, where $\theta$ is the angle between $F_1$ or $F_2$ and a dotted line 10. In this embodiment, a force acting on the peak of a protrusion structure will be withstood by two forces each with a smaller amount. Therefore, the protrusion structure provides higher rigidity and can withstand a higher force or momentum impact in comparison with the traditional flat structure.

The present invention provides a portable electronic apparatus having at least one protrusion structure formed thereon to provide higher rigidity and strength such that the portable electronic apparatus can prevent the inner sophisticated or fragile electronic devices thereof from being damaged by the impact of a dropping force.

Figure 2A:
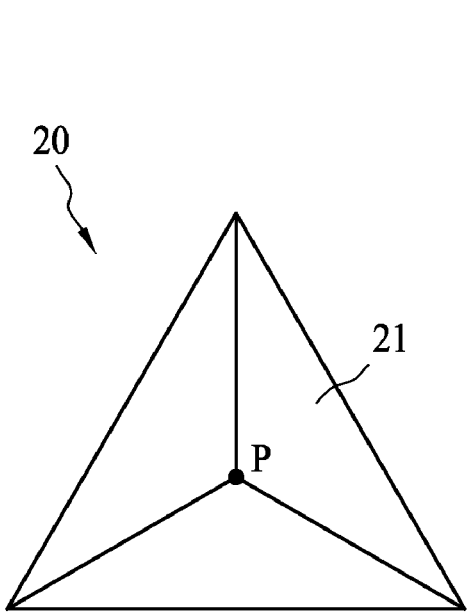
FIGS. 2(a) through 2(d) illustrate the top view of the protrusion structures in accordance with embodiments of the present invention.
Figure 2B:
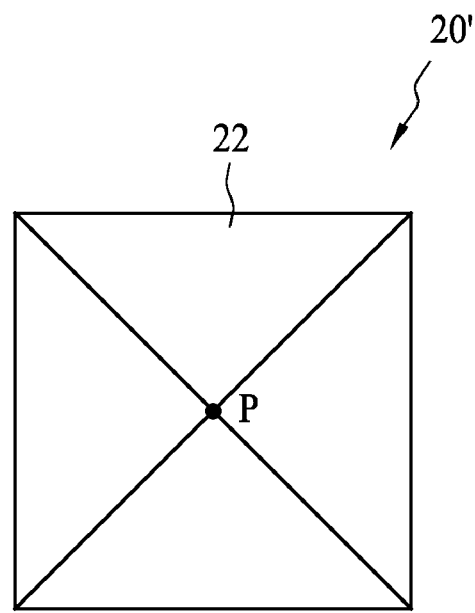
Figure 2C:
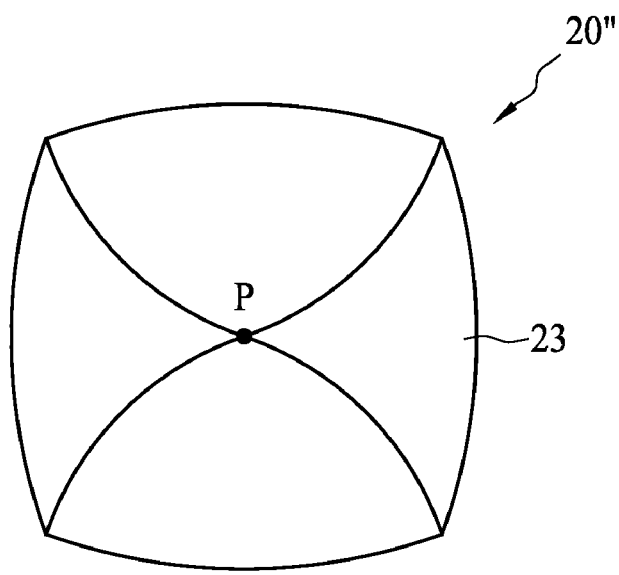
Figure 2D:
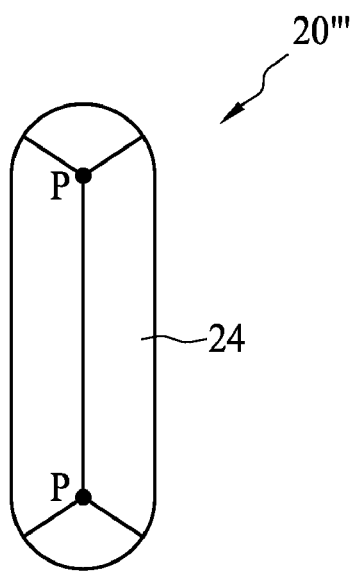

FIGS. 2(a) through 2(d) illustrate the top views of protrusion structures in accordance with some embodiments of the present invention. The protrusion structures are constituted of a plurality of facets; "P" indicates the peaks formed by the facets. In FIG. 2(a), a protrusion structure 20 comprises three triangular facets 21 of which junctions merge at a peak "P". In other words, the peak "P" is at the intersection of the junctions of the facets 21. The protrusion structure 20 is in the form of a pyramid with a triangular base. In FIG. 2(b), the protrusion structure 20' comprises four triangular facets 22 of which junctions merge at a peak "P", and is in the form of a pyramid with a quadrangular base. FIG. 2(c) illustrates a curved protrusion structure 20" in which four curved facets 23 merge at a peak "P". FIG. 2(d) illustrates another protrusion structure 20''' comprising four facets 24 and two peaks "P", and two of the facets 24 are quadrangles. In practice, many other protrusion structures of different shapes can also be utilized as desired.

Figure 3:
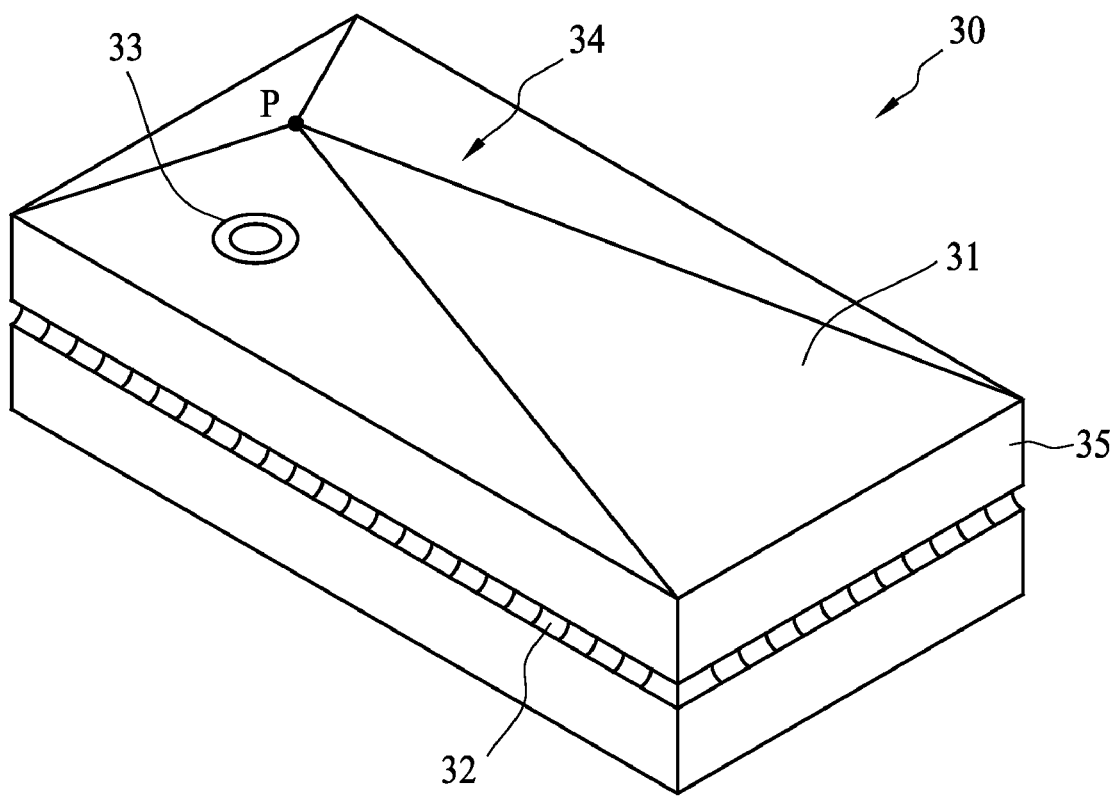
FIGS. 3 and 4 illustrate a portable electronic apparatus in accordance with an embodiment of the present invention.
Figure 4:
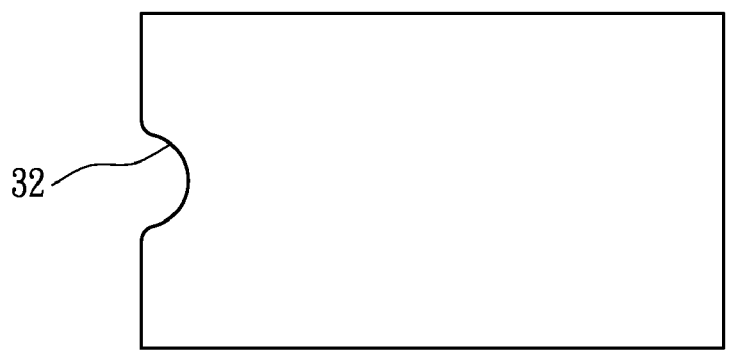

FIG. 3 illustrates a perspective view of a portable electronic apparatus 30 such as a portable computer, a cellular phone, a smart phone or a PDA. The portable electronic apparatus 30 includes a rear side 34 having four facets 31 formed thereon. The rear side 34 is formed on the housing 35 of the portable electronic apparatus 30. In this embodiment, the facets 31 are triangles and are substantially flat, and form a pyramid protruding from the rear side 34. A camera module 33 is accommodated by the housing 35, and the camera module 33 has a camera lens exposed from the rear side 34 or one of the facets 31. The camera module 33 is installed in a facet 31 and is placed lower than the peak "P". If the portable electronic apparatus 30 is dropped, the housing 35 may impact on the ground. Consequently, the impact force will be dispersed and withstood by the four facets 31, so that the force will not impact the camera module 33 directly. Accordingly, the camera module 33 will be effectively protected from being damaged. In addition, the sidewalls of the portable electronic apparatus 30 can be equipped with or surrounded by a belt frame 32, e.g., a concave structure as shown in FIG. 4, that could absorb the impact force like a buffer does.

Figure 5A:
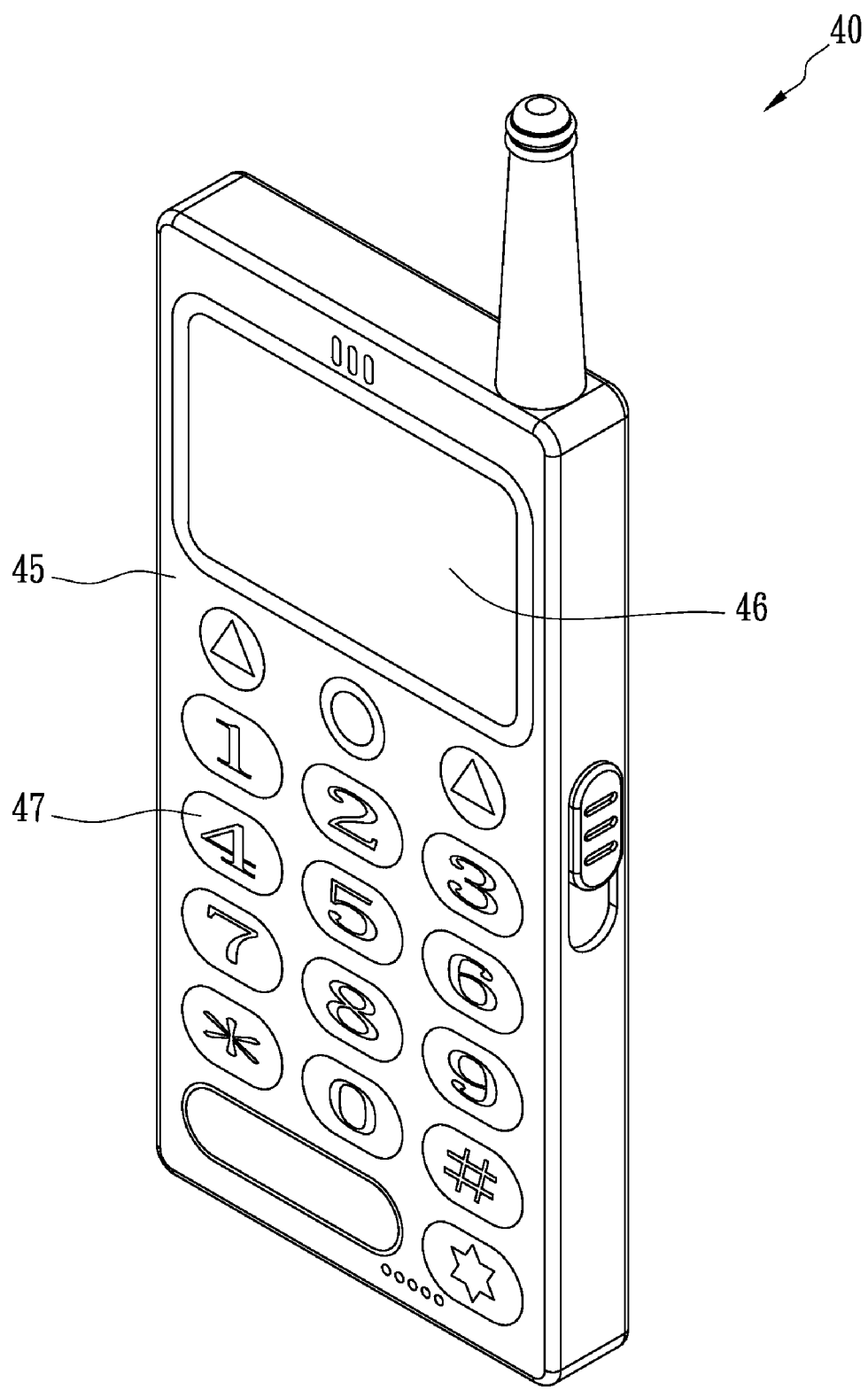
FIGS. 5(a) through 5(c) illustrate a portable electronic apparatuses in accordance with other embodiments of the present invention.
Figure 5B:
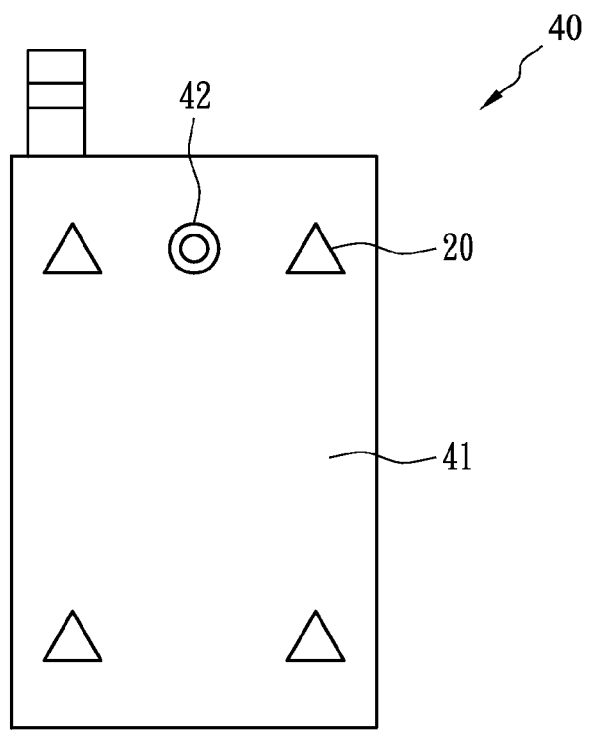
Figure 5C:
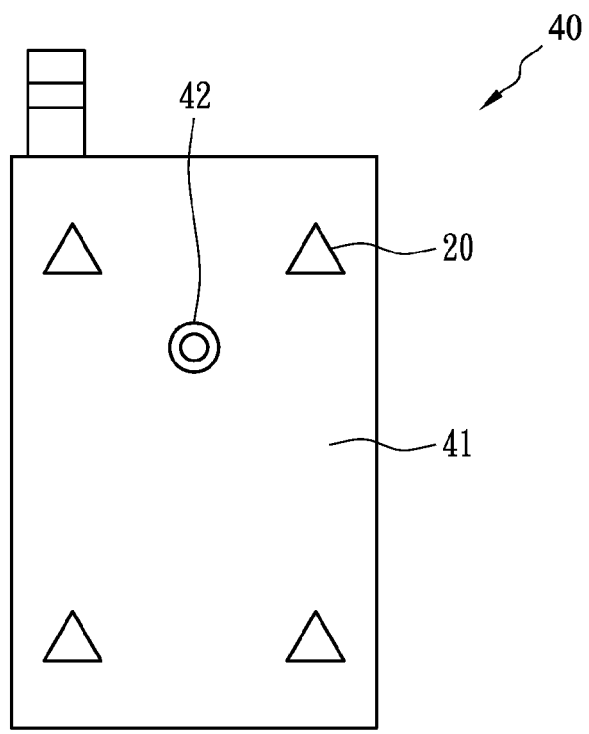

FIGS. 5(a) through 5(c) illustrate other embodiments in accordance with the present invention. As shown in FIG. 5(a), a portable electronic apparatus 40 such as a mobile phone has a front side 45 including a display 46 for displaying data and a keypad 47 for inputting data. FIG. 5(b) and FIG. 5(c) illustrate the rear side 41 of the portable electronic apparatus 40. The rear side 41 is opposite to the display 46. Four protrusion structures, for example, the protrusion structures 20 of FIG. 2(a), are disposed at four corners of the rear side 41 of the portable electronic apparatus 40, and a camera module 42 is placed between the two upper protrusion structures 20. Accordingly, four peaks are formed adjacent to four corners of the rear side 41, and the camera module 42 placed at a concave portion between the two upper protrusion structures 20 can be protected from being damaged. Alternatively, the camera module 42 can be placed among four protrusion structures 20 as shown in FIG. 5(c).

Figure 6A:
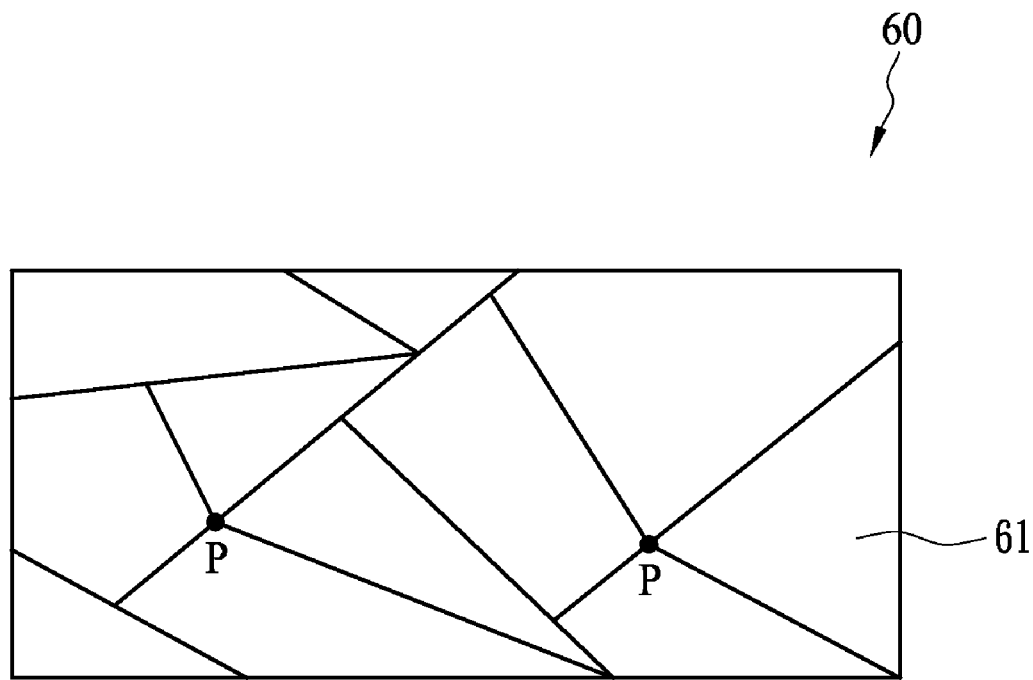
FIGS. 6(a) and 6(b) illustrate protrusion structures in accordance with another embodiment of the present invention.
Figure 6B:
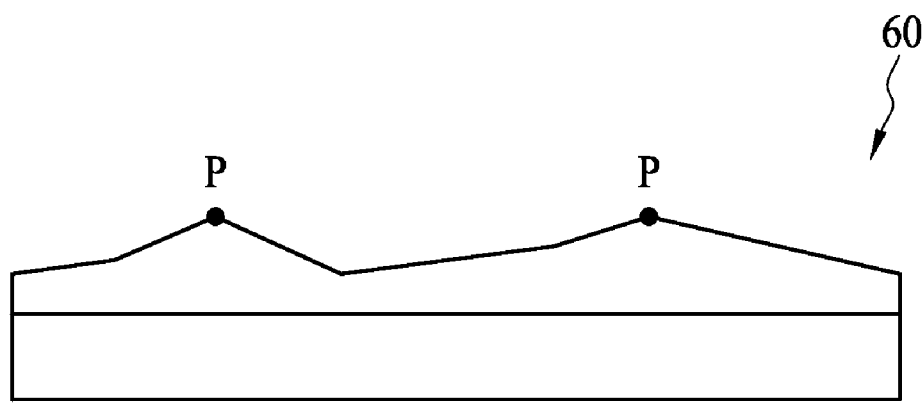

FIG. 6(a) and FIG. 6(b) illustrate the top view and side view of a surface with fractal protrusion structures 60, respectively. The fractal protrusion structures 60 include a plurality of fractal facets 61 that forms a plurality of peaks and are canted relative to one another. In this embodiment, two highest peaks "P" are arranged close to the central area of the surface to mainly and evenly withstand a force impact, and the two peaks "P" are positioned at junctions of the facets 61. Moreover, the surface of the fractal protrusion structures 60 that is like a honeycomb may provide a special geometrical visual effect. For instance, the reflective lights of facets 61 can shine in different directions if the facets 61 have shining surfaces. Therefore, the portable electronic apparatus with such honeycombs could be more attractive due to the improvement in artistic value.

Figure 7A:
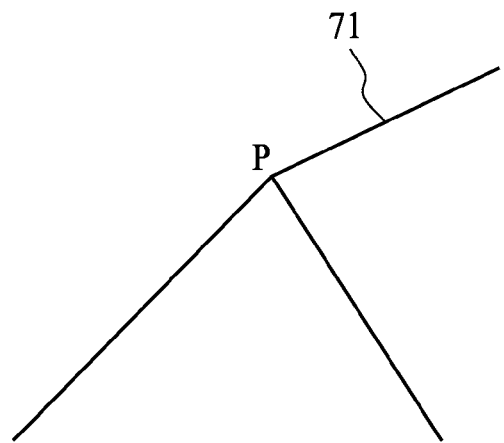
FIGS. 7(a), 7(b) and 7(c) illustrate the junctions of the facets of the protrusion structure in accordance with the present invention.
Figure 7B:
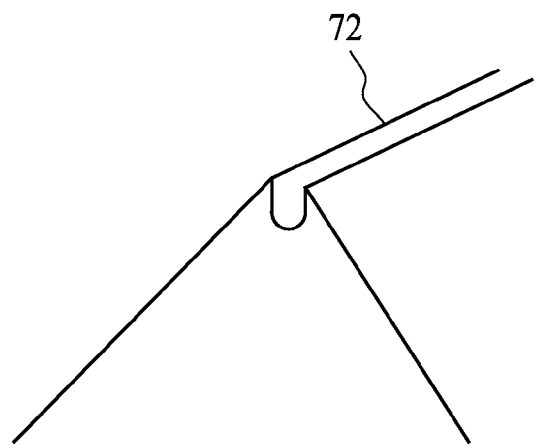
Figure 7C:
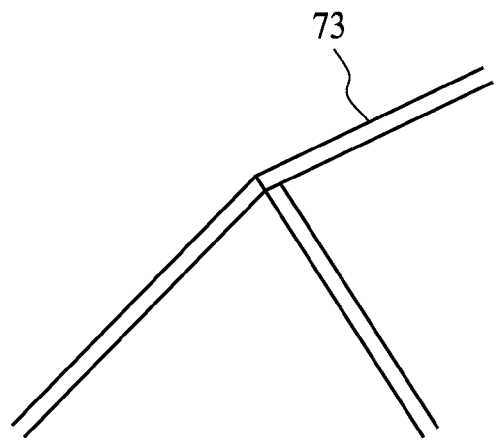

FIGS. 7(a) through 7(c) illustrate three embodiments of the junctions between facets. In addition to a ridge junction 71 as shown in FIG. 7(a), a junction between facets could be a groove 72 or a flat surface 73 as shown in FIG. 7(b) and FIG. 7(c), respectively. The junctions 72 and 73 shown in FIG. 7(b) and FIG. 7(c) have larger areas in comparison with that of the junction 71, so that they can withstand large forces and are not easily worn down.

Most of the traditional housings or cases of a portable electronic apparatus follow a simple structure such as a flat surface or a curved surface. However, the traditional housing of a portable electronic apparatus does not perform well in a dropping test or a choc test for testing endurance. A portable electronic apparatus and the housing thereof according to the present invention can withstand the impact force by allowing it to be shared among all the facets described herein, so that the apparatus becomes more rigid and can decrease the likelihood of damage.

The above-described embodiments of the present invention are intended to be illustrative only. Numerous alternative embodiments may be devised by those skilled in the art without departing from the scope of the following claims.

The invention claimed is:

1. A portable electronic apparatus, comprising: a display for displaying data; a housing having a front side and a rear side, the housing accommodating the display on the front side and having the rear side opposite to the display, wherein the rear side includes a plurality of facets that are all canted relative to one another and form at least two protrusion structures, each protrusion structures is formed by at least three of the facets; and a camera module accommodated by the housing, the camera module having a camera lens exposed from one of the canted facets.

2. The portable electronic apparatus of claim 1, wherein the facets form at least one pyramid protruding from the rear side.

3. The portable electronic apparatus of claim 1, wherein each of the facets is substantially flat.

4. The portable electronic apparatus of claim 1, further comprising sidewalls.

5. The portable electronic apparatus of claim 1, wherein each peak is positioned at junctions of the facets.

6. The portable electronic apparatus of claim 5, wherein the junctions of the facets are in the form of ridges, grooves or flat surfaces.

7. The portable electronic apparatus of claim 1, which is a mobile phone or a PDA.

8. A portable electronic apparatus, comprising: a display for displaying data; a housing having a front side and a rear side, the housing accommodating the display on the front side and having the rear side opposite to the display, wherein the rear side includes a plurality of facets that are all canted relative to one another and form at least two protrusion structures, wherein each protrusion structure is formed by at least three of the facets; and a camera module accommodated by the housing, the camera module having a camera lens exposed from the rear side and placed at a concave portion between the at least two protrusion structures.

9. The portable electronic apparatus of claim 8, wherein the facets form at least one pyramid protruding from the rear side.

10. The portable electronic apparatus of claim 8, wherein each of the facets is substantially flat.

11. The portable electronic apparatus of claim 8, wherein each peak is positioned at junctions of the facets.

12. The portable electronic apparatus of claim 11, wherein the junctions of the facets are in the form of ridges, grooves or flat surfaces.

13. The portable electronic apparatus of claim 8, wherein the rear side includes four protrusion structures disposed at four corners of the rear side, respectively.

14. The potable electronic apparatus of claim 8, which is a mobile phone or a PDA.

* * * * *